US012313093B2

(12) United States Patent
Yeo

(10) Patent No.: US 12,313,093 B2
(45) Date of Patent: May 27, 2025

(54) HYDRAULIC SYSTEM

(71) Applicant: HD HYUNDAI INFRACORE CO., LTD., Incheon (KR)

(72) Inventor: Myeongku Yeo, Seoul (KR)

(73) Assignee: HD HYUNDAI INFRACORE CO., LTD., Incheon (KR)

(*) Notice: Subject to any disclaimer, the term of this patent is extended or adjusted under 35 U.S.C. 154(b) by 0 days.

(21) Appl. No.: 18/682,369

(22) PCT Filed: Aug. 5, 2022

(86) PCT No.: PCT/KR2022/011708
§ 371 (c)(1),
(2) Date: Feb. 8, 2024

(87) PCT Pub. No.: WO2023/018125
PCT Pub. Date: Feb. 16, 2023

(65) Prior Publication Data

US 2024/0352951 A1 Oct. 24, 2024

(30) Foreign Application Priority Data

Aug. 10, 2021 (KR) ........................ 10-2021-0105619
Aug. 10, 2021 (KR) ........................ 10-2021-0105648

(51) Int. Cl.
*F15B 13/06* (2006.01)
*F15B 13/02* (2006.01)

(52) U.S. Cl.
CPC ............ *F15B 13/06* (2013.01); *F15B 13/025* (2013.01); *F15B 2211/45* (2013.01)

(58) Field of Classification Search
CPC .... F15B 13/06; F15B 13/025; F15B 2211/45; E02F 9/2282
See application file for complete search history.

(56) References Cited

U.S. PATENT DOCUMENTS 7,594,395 B2 * 9/2009 Oka ...................... E02F 9/2235 60/486
11,377,822 B2 * 7/2022 Takahashi ................ E02F 9/22
(Continued)

FOREIGN PATENT DOCUMENTS

JP 2014-34990 A 2/2014
KR 10-2010-0044585 A 4/2010
(Continued)

OTHER PUBLICATIONS

International Search Report issued on Nov. 28, 2022, for corresponding International Patent Application No. PCT/KR2022/011708, along with an English translation (7 pages).
(Continued)

*Primary Examiner* — Abiy Teka
(74) *Attorney, Agent, or Firm* — Hauptman Ham, LLP

(57) ABSTRACT

A hydraulic system according to an embodiment of the present invention comprises: a main hydraulic pump for discharging a hydraulic fluid; a plurality of driving apparatuses operating by receiving the hydraulic fluid; a parallel flow path through which the hydraulic fluid discharged by the main hydraulic pump flows; a plurality of control spools respectively connected to the parallel flow path in parallel to control the supply of hydraulic fluid to the plurality of driving apparatuses; and a plurality of electronic proportional decompression valves for adjusting a pilot pressure, applied to the respective control spools to be proportional to a current signal which has been input, wherein, if the plurality of control spools do not operate, the hydraulic fluid discharged by the main hydraulic pump is drained into an oil tank via the parallel flow path without passing through the plurality of control spools.

14 Claims, 9 Drawing Sheets

(56) References Cited

U.S. PATENT DOCUMENTS

| | | | | |
|---|---|---|---|---|
| 11,686,069 | B2 * | 6/2023 | Yamamoto ............ | E02F 9/2207 |
| | | | | 701/50 |
| 2019/0234050 | A1 * | 8/2019 | Kim ...................... | E02F 9/2235 |

FOREIGN PATENT DOCUMENTS

| | | | |
|---|---|---|---|
| KR | 10-2015-0033928 | A | 4/2015 |
| KR | 10-2017-0092918 | A | 8/2017 |
| KR | 10-2019-0085720 | A | 7/2019 |
| KR | 10-2019-0123725 | A | 11/2019 |

OTHER PUBLICATIONS

Written Opinion issued on Nov. 28, 2022, for corresponding International Patent Application No. PCT/KR2022/011708 (4 pages).

* cited by examiner

HYDRAULIC SYSTEM

CROSS REFERENCE TO RELATED APPLICATION

The present application is a national stage filing under 35 U.S.C § 371 of PCT application number PCT/KR2022/011708 filed on Aug. 5, 2022, which is based upon and claims the benefit of priority to Korean Patent Application Nos. 10-2021-0105619 and 10-2021-0105648, filed on Aug. 10, 2021, in the Korean Intellectual Property Office. All of the aforementioned applications are incorporated herein by reference in their entireties.

TECHNICAL FIELD

The present disclosure relates to a hydraulic system and, more particularly, to a hydraulic system that is used for construction equipment.

BACKGROUND ART

In general, a hydraulic system operates various driving apparatuses by transmitting power through a hydraulic fluid discharged by a hydraulic pump. Such hydraulic systems are generally used for construction equipment, industrial vehicles, or the like. For example, a hydraulic system that is used for construction equipment drives various driving apparatuses such as a running motor that is used for running through a hydraulic fluid that is discharged from a hydraulic pump that is operated by an engine, a swing motor that is used for swing of an upper swing body, and a boom cylinder, an arm cylinder, a bucket cylinder, an option cylinder, etc. that are used for a working apparatus.

Further, these driving apparatuses are driven by a hydraulic fluid that is discharged from a variable displacement hydraulic pump that is driven by an engine or an electric motor, and the hydraulic fluid discharged from the hydraulic pump is distributed to driving apparatuses by a hydraulic control valve having a plurality of control spools. That is, a hydraulic control valve has a plurality of spools proportioned to the number of driving apparatuses to be controlled.

Further, since hydraulic systems based on mechanical control in the related art include several flow paths such as a center bypass flow path, a running signal flow path, and an auto-idle flow path for mechanical control, not only does the entire structure become complicated, but the size is unavoidably increased.

Recently, hydraulic control valves that are controlled in an electronic type become widespread, but such hydraulic control valves are used with only the control type changed into an electronic type with the valve body thereof that is controlled in a mechanical type, so there is a problem that the structure is still complicated and the size is unnecessarily large even though the entire hydraulic system is based on an electronic control type.

DETAILED DESCRIPTION OF INVENTION

Technical Problems

An embodiment of the present disclosure provides an electronic control-type hydraulic system having a simplified entire structure.

Technical Solution

According to an embodiment of the present disclosure, a hydraulic system includes: a main hydraulic pump discharging a hydraulic fluid; a plurality of driving apparatuses operating by receiving a hydraulic fluid; a parallel flow path through which the hydraulic fluid discharged by the main hydraulic pump moves; a plurality of control spools connected in parallel to the parallel flow path, respectively, and controlling supply of a hydraulic fluid to the plurality of driving apparatuses; and a plurality of electronic proportional pressure reducing valves adjusting a pilot pressure that is applied to an end of each of the plurality of control spools in proportion to an input current signal, wherein when the plurality of control spools is not operated, the hydraulic fluid discharged by the main hydraulic pump is drained into an oil tank through the parallel flow path without passing through the plurality of control spools.

The hydraulic system may further include a bypass valve installed in the parallel flow path and opening and closing the parallel flow path.

Further, the hydraulic system may further include: a plurality of connection flow paths connecting the plurality of control spools to the parallel flow path, respectively; and a plurality of check valves installed in the plurality of connection flow paths, respectively, and restricting movement of a hydraulic fluid from the plurality of connection flow paths to the parallel flow path.

Further, the hydraulic system may further include: a plurality of first supply flow paths connecting first side regions of the plurality of control spools to first sides of the plurality of driving apparatuses, respectively; and a plurality of second supply flow paths connecting second side regions of the plurality of control spools to second sides of the plurality of driving apparatuses, respectively, Further, a hydraulic fluid may be supplied through the plurality of first supply flow paths or the plurality of second supply flow paths, depending on switching of the plurality of control spools.

The plurality of electronic proportional pressure reducing valves may be installed in a main control valve housing accommodating the plurality of control spools.

The plurality of electronic proportional pressure reducing valves may be installed in a separate electronic proportional pressure reducing valve block, and the electronic proportional pressure reducing valve block may be detachably coupled to a main control valve housing accommodating the plurality of control spools.

The main hydraulic pump may include a first main hydraulic pump and a second main hydraulic pump, and the parallel flow path may include a first parallel flow path delivering a hydraulic fluid discharged by the first main hydraulic pump and a second parallel flow path delivering a hydraulic fluid discharged by the second main hydraulic pump.

The plurality of control spools may be connected in parallel to the first parallel flow path or the second parallel flow path, respectively, and may distribute the hydraulic fluids discharged by the first main hydraulic pump and the second main hydraulic pump to the plurality of driving apparatuses.

The hydraulic system may further include a bypass valve connected in parallel to the parallel flow path.

Further, the hydraulic system may further include an additional valve block accommodating the plurality of control spools and detachably coupled to a main control valve housing in which the parallel flow path is formed. Further, the additional valve block may have: an additional parallel flow path connected with the parallel flow path; one or more additional control spools each connected in parallel to the additional parallel flow path; and a plurality of additional electronic proportional pressure reducing valves adjusting a pilot pressure that is applied to an end of each of the one or more additional control spools in proportion to an input current signal.

Further, the additional valve block may further have: an additional connection flow path connecting the additional control spool to the additional parallel flow path; and an additional check valve installed in the additional connection flow path and restricting movement of a hydraulic fluid from the additional connection flow path to the additional parallel flow path.

Further, the additional valve block may further have: first additional supply flow paths connected with first side regions of the additional control spools, respectively; and second additional supply flow paths connected with second side regions of the additional control spools, respectively. Further, a hydraulic fluid may be supplied through the first additional supply flow path or the second additional supply flow path, depending on switching of the additional control spools.

A hydraulic fluid that has passed through the bypass valve may be drained into an oil tank.

Effect of Invention

According to an embodiment of the present disclosure, the hydraulic system is an electronic control type and the entire structure thereof can be simplified.

BEST MODE FOR CARRYING OUT THE INVENTION

Figure 1:
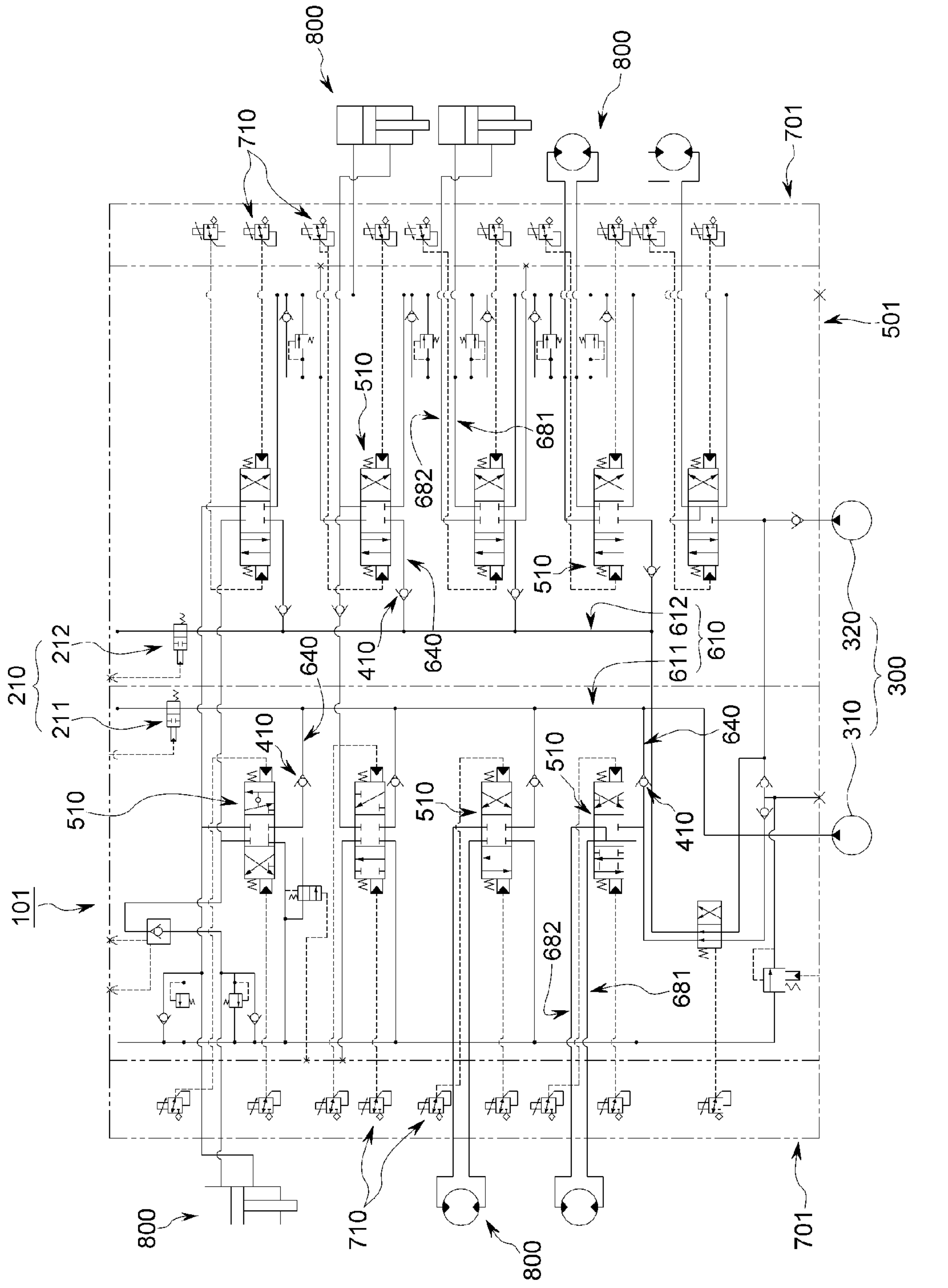
FIG. 1 is a hydraulic circuit diagram of a hydraulic system according to a first embodiment of the present disclosure.

Embodiments of the present disclosure will be described in detail with reference to the accompanying drawings so that those skilled in the art can easily accomplish the present disclosure. The present disclosure can be implemented in various different ways and is not limited to the embodiments described herein.

In various embodiments, components having the same configuration are given the same reference numerals and described representatively in a first embodiment, only configurations different from the first embodiment are described in other embodiments.

It should be noted that the drawings are schematic and are not constructed to fit the scales. The relative dimensions and ratios of the parts shown in the figures are exaggerated and reduced for clarity and convenience and certain dimensions are only examples without limiting the parts. The same structures, components, or parts shown in two or more drawings are given the same reference numerals to show similar characteristics.

Embodiments of the present disclosure show ideal embodiments of the present disclosure in detail. Accordingly, various changes may be predicted in the diagrams. Therefore, embodiments are not limited to specific shapes in regions shown in the figures, and for example, also include changes in shape by manufacturing.

Further, in the flowing description, unless otherwise defined, all terms including technical and scientific terms used herein have the same meaning as commonly understood by those skilled in the art to which this disclosure belongs. All terms used herein are selected not to limit the scope of the present disclosure, but to make the present disclosure clearer.

Further, the terms “comprise”, “include”, “have”, etc. used herein should be understood as open-ended terms implying the possibility of including other embodiments, unless stated otherwise in phrases and sentences including the terms.

Further, the singular forms described herein are intended to include the plural forms as well, unless the context clearly indicates otherwise, and which will be applied in the same way to those in claims.

Further, terms such as “first”, “second”, etc. are used only for the purpose of distinguishing a plurality of constitutive elements from other constitutive elements, rather than to limit the order or priority of the constitutive elements.

Hereafter, the first embodiment of the present disclosure is described with reference to FIG. 1.

A hydraulic system 101 according to the first embodiment of the present disclosure may be used to drive, for example, a running apparatus and various working apparatuses in construction equipment.

As shown in FIG. 1, the hydraulic system 101 according to the first embodiment of the present disclosure includes a main hydraulic pump 300, a plurality of driving apparatuses 800, a parallel flow path 610, a plurality of control spools 510, and a plurality of electronic proportional pressure reducing valves 710.

Further, the hydraulic system 101 according to the first embodiment of the present disclosure may further include a bypass valve 210, a plurality of connection flow paths 640, a plurality of check valves 410, a plurality of first supply flow paths 681, a plurality of second supply flow paths 682, a main control valve housing 501, and an electronic proportional pressure reducing valve block 701.

The main hydraulic pump 300 can discharge a hydraulic fluid. Further, the main hydraulic pump 300 is connected with a power apparatus such as an engine or a motor and can be driven by rotation power provided by the power apparatus. Further, the main hydraulic pump 300 may be a swash-plate variable displacement type. That is, the main hydraulic pump 300 can adjust a discharge flow rate by adjusting the angle of a swash plate.

Further, in the first embodiment of the present disclosure, the main hydraulic pump 300 may include a first main hydraulic pump 310 and a second main hydraulic pump 320.

The plurality of driving apparatuses 800 can be operated by a hydraulic fluid discharged and provided by the main hydraulic pump 300. In this case, the first main hydraulic pump 310 and the second main hydraulic pump 320 may divisionally supply a hydraulic fluid to the plurality of driving apparatuses 800.

For example, when the hydraulic system 101 is used for construction equipment such as an excavator, the plurality of driving apparatuses 800 may include a running motor that is used for running, a swing motor that is used for swinging of an upper swing body, and a boom cylinder, an arm cylinder, a bucket cylinder, an option cylinder, etc. that are used for a working apparatus.

The parallel flow path 610 can deliver a hydraulic fluid discharged by the main hydraulic pump 300. Further, the parallel flow path 610 may be elongated in a direction crossing the reciprocation direction of the plurality of control spools 510 to be described below. In this configuration, the plurality of control spools 510 reciprocates longitudinally. For example, when the plurality of control spools 510 is disposed to have a length in the transverse direction, the parallel flow path 610 may be formed to have a length in the lengthwise direction. Further, the parallel flow path 610 can be supplied with a hydraulic fluid from the main hydraulic pump 300 and can distribute the hydraulic fluid to the plurality of control spools 510.

Further, the parallel flow path 610 may include a first parallel flow path 611 that delivers the hydraulic fluid discharged by the first main hydraulic pump 310 and a second parallel flow path 612 that delivers the hydraulic fluid discharged by the second main hydraulic pump 320.

The plurality of control spools 510 is connected in parallel to the parallel flow path 610 and can control supply of a hydraulic fluid to the plurality of driving apparatuses 800. The plurality of control spools 510 may be installed to be able to separately reciprocate in the main control valve housing 501 to be described below. Further, as the positions of the plurality of control spools 510 are changed, the movement direction of a hydraulic fluid can be controlled. That is, the plurality of control spools 510 can control whether to operate the plurality of driving apparatuses 800 and the operation directions of the plurality of driving apparatuses 800.

Further, the plurality of control spools 510 may be provided in proportion to the number of the plurality of driving apparatuses 800. That is, the number of the control spools 510 may depend on the number of the driving apparatuses 800 to supply a hydraulic fluid.

Further, the plurality of control spools 510 is each connected in parallel to the first parallel flow path 611 or the second parallel flow path 612 and can distribute a hydraulic fluid discharged by the first main hydraulic pump 310 and the second main hydraulic pump 320 to the plurality of driving apparatuses 800.

The plurality of electronic proportional pressure reducing valves (EPPRV) 710 can adjust a pilot pressure that is applied to an end of each of the plurality of control spools 510 in proportion to an input control signal. For example, two electronic proportional pressure reducing valves may be connected respectively to both ends of each of the control spools 510 and may supply a pilot pressure. Accordingly, the plurality of control spools 510 can control flow of a hydraulic fluid by changing the position depending on a pilot pressure.

Accordingly, the hydraulic system 101 may be configured such that when the plurality of control spools 510 is not operated, the hydraulic fluid discharged by the main hydraulic pump 300 is drained into an oil tank (not shown) through the parallel flow path 610 without passing through the plurality of control spools 510.

The bypass valve 210 is installed in the parallel flow path 610 and can open and close the parallel flow path 610. In this configuration, the bypass valve 210 can control draining of a hydraulic fluid in the parallel flow path 610. For example, the hydraulic fluid that has passed through the bypass valve 210 can be drained into the oil tank (not shown).

Further, the bypass valve 210 may include a first bypass valve 211 installed in the first parallel flow path 611 and a second bypass valve 212 installed in the second parallel flow path 612.

The bypass valve 210 can be used to reduce a peak of pressure of a hydraulic fluid and generate a make-up flow rate in a closed loop-type hydraulic system (closed loop system). That is, quick start is enabled by quickly reducing a peak of pressure of a hydraulic fluid and generating a make-up flow rate in comparison to closed loop-type hydraulic systems of the related art, so it is possible to reduce fuel consumption. Further, responsiveness is increased, so it is possible to quickly deal with turning or sudden stopping.

The plurality of connection flow paths 640 can connect the plurality of control spools 510 to the parallel flow path 610, respectively. That is, the plurality of control spools 510 can be connected in parallel to the parallel flow path 610 by the plurality of connection flow paths 640, respectively.

The plurality of check valves 410 is installed in the plurality of connection flow paths 640, respectively, and can restrict movement of a hydraulic fluid from the plurality of connection flow paths 640 to the parallel flow path 610. When the pressure of a hydraulic fluid instantaneously rapidly increases while the various driving apparatuses 800 are operated, the plurality of check valves 410 prevents the hydraulic fluid from flowing backward to the main hydraulic pump 300, thereby being able to protect the main hydraulic pump 300. Further, when the check valves 410 completely block flow of a hydraulic fluid, it is possible to prevent the driving apparatuses 800 such as a boom cylinder from sagging due to their weight.

The plurality of first supply flow paths 681 can connect first side regions of the plurality of control spools 510 to first sides of the plurality of driving apparatuses 800, respectively.

The plurality of second supply flow paths 682 can connect second side regions of the plurality of control spools 510 to second sides of the plurality of driving apparatuses 800, respectively.

Further, as the positions of the plurality of control spools 510 are changed, the hydraulic fluid that has moved to the plurality of control spools 510 through the plurality of connection flow paths 640 can be supplied through the plurality of first supply flow paths 681 or the plurality of second supply flow paths 682. That is, the plurality of control spools 510 can not only distribute the hydraulic fluid discharged by the main hydraulic pump 300 to the various driving apparatuses 800, but change the operation direction of each of the driving apparatuses 800.

Accordingly, the various driving apparatuses 800 can perform operations of stretching and contracting, forward moving and backward moving, or left swinging and right swinging. In detail, for example, a swing motor can swing left when a hydraulic fluid is supplied through the first supply flow path 681 and can swing right when a hydraulic fluid is supplied through the second supply flow path 682, depending on a change of the positions of the control spools 510. Further, various cylinders can stretch when a hydraulic fluid is supplied through the first supply flow path 681 and can contract when a hydraulic fluid is supplied through the second supply flow path 682, depending on a change of the positions of the control spools 510.

In this way, the hydraulic system 101 according to the present disclosure is controlled in an electronic control type in which the control spools 300 are controlled in accordance with a current signal that is input to the electronic proportional pressure reducing valve 700.

The plurality of control spools 510 may be accommodated in the main control valve housing 501. Further, in the main control valve housing 501, the parallel flow path 610, the connection flow path 640, the first supply flow path 681, and the second supply flow path 682 may be formed and the bypass valve 210 and the check valve 410 may be further accommodated.

The electronic proportional pressure reducing valve block 701 may be provided separately from the main control valve housing 501 and may be detachably coupled to the main control valve housing 501. Further, a plurality of electronic proportional pressure reducing valves 700 may be installed in the electronic proportional pressure reducing valve block 701.

By this configuration, it is possible to simplify the entire structure of the hydraulic system 101 according to the first embodiment of the present disclosure and reduce the size thereof.

In particular, the hydraulic system 101 can be manufactured to be suitable for an electronic control type that uses a current signal.

Further, since the main control valve housing 501 and the electronic proportional pressure reducing valve block 701 are independently and separately manufactured and then combined, it is easy to manufacture and maintain them and simplify the structure of the main control valve housing 501.

Hereafter, the second embodiment of the present disclosure is described with reference to FIG. 2.

Figure 2:
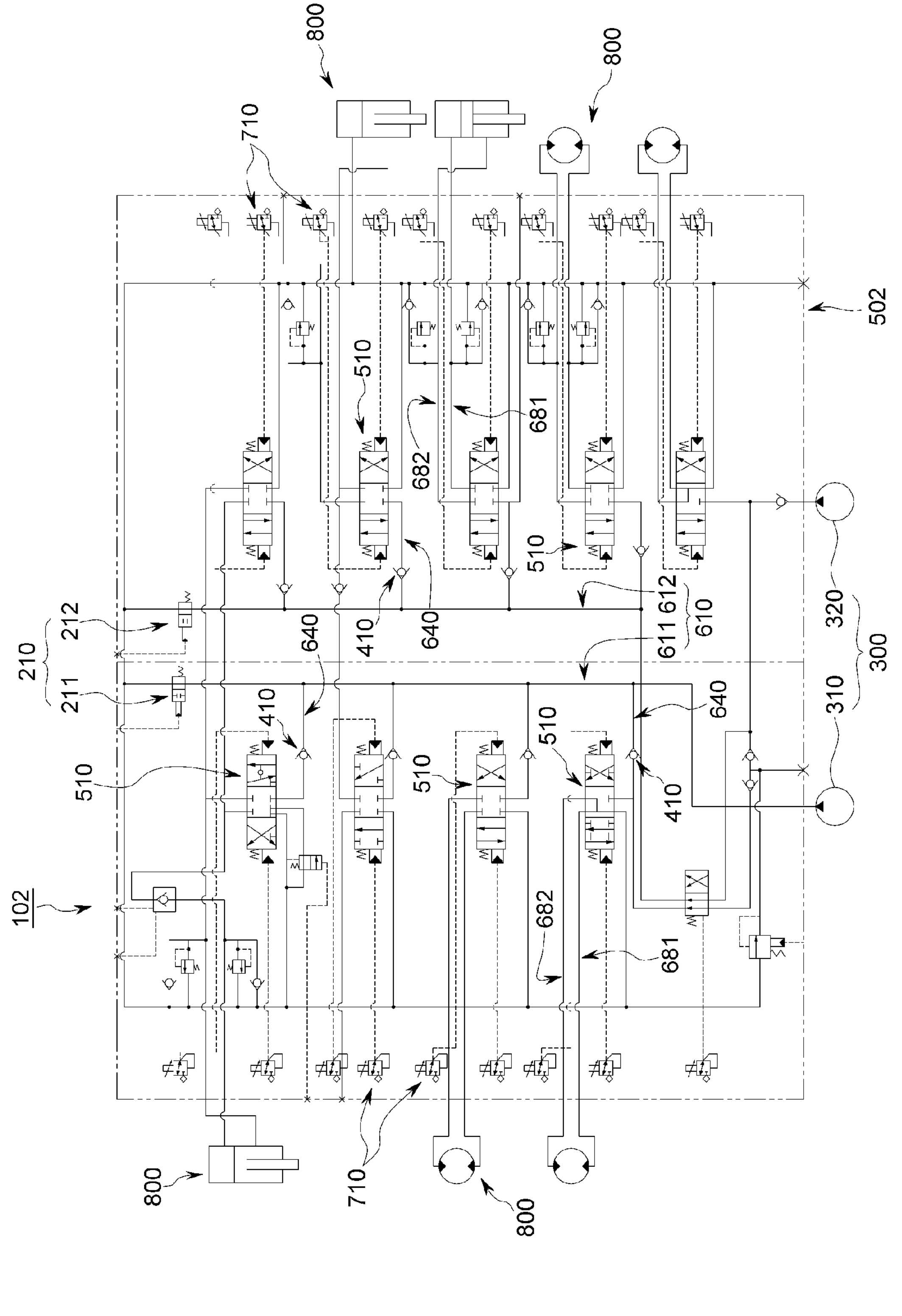
FIG. 2 is a hydraulic circuit diagram of a hydraulic system according to a second embodiment of the present disclosure.

As shown in FIG. 2, in a hydraulic system 102 according to the second embodiment of the present disclosure, a separate electronic proportional pressure reducing valve block is not provided and a plurality of electronic proportional pressure reducing valves 710 may be accommodated in a main control valve housing 502.

As described above, in the second embodiment of the present disclosure, an electronic proportional pressure reducing valve block is omitted and electronic proportional pressure reducing valves 710 are installed in the main control valve housing 501, whereby it is possible to make the entire size compact.

Hereafter, the third embodiment of the present disclosure is described with reference to FIG. 3.

Figure 3:
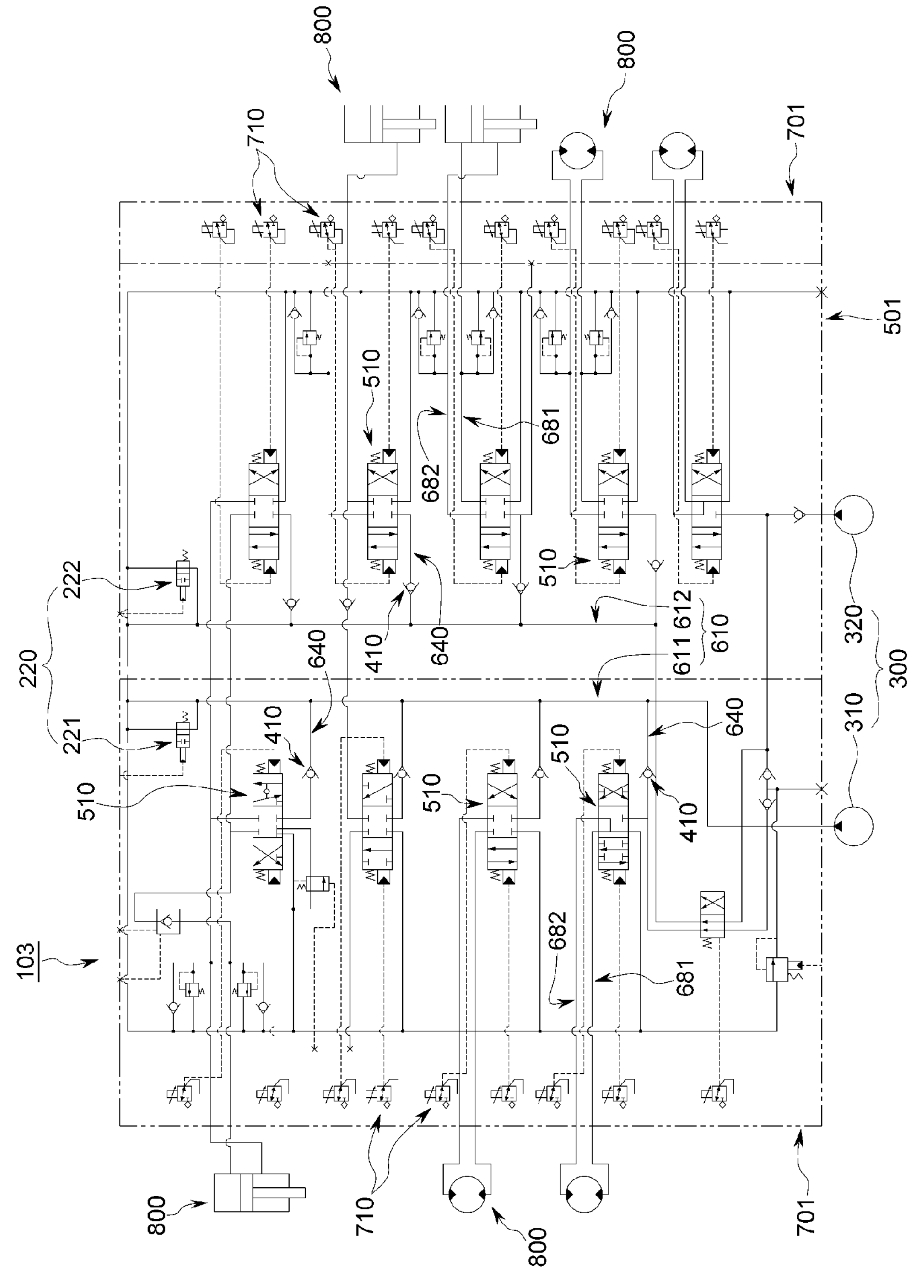
FIG. 3 is a hydraulic circuit diagram of a hydraulic system according to a third embodiment of the present disclosure.

As shown in FIG. 3, in a hydraulic system 103 according to the third embodiment of the present disclosure, a bypass valve 220 and a parallel flow path 610 may be connected in parallel. That is, the bypass valve 220 may be installed in a flow path diverging from the parallel flow path 610.

In detail, the bypass valve 220 may include a first bypass valve 221 installed in a flow path diverging from the first parallel flow path 611 and a second bypass valve 222 installed in a flow path diverging from the second parallel flow path 612.

As described above, since the bypass valve 220 is disposed in parallel with the parallel flow path 610, if necessary, it is possible to improve expandability of the hydraulic system 103 by extending the parallel flow path 610.

Hereafter, the fourth embodiment of the present disclosure is described with reference to FIG. 4.

Figure 4:
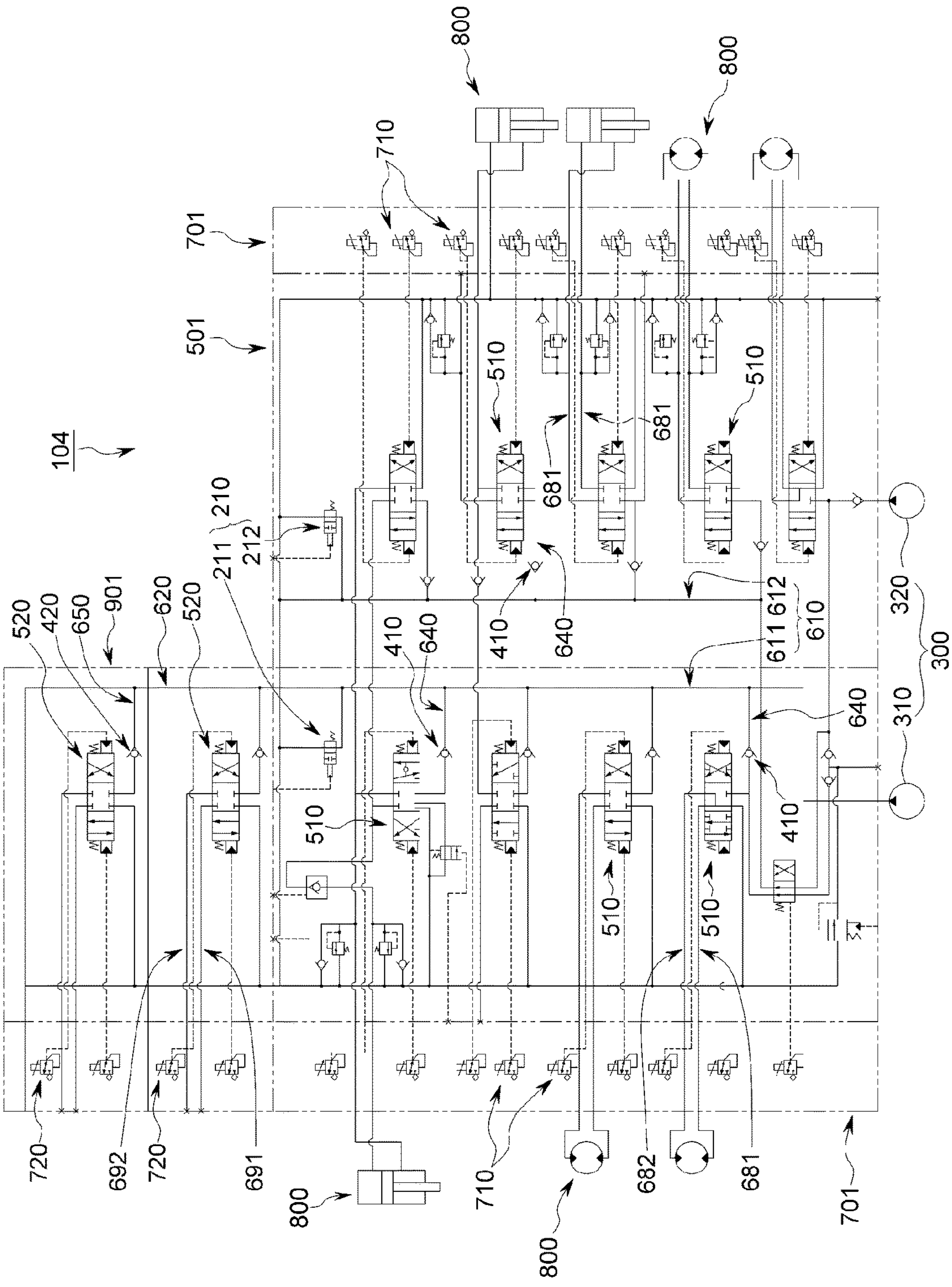
FIG. 4 is a hydraulic circuit diagram of a hydraulic system according to a fourth embodiment of the present disclosure.

As shown in FIG. 4, in a hydraulic system 104 according to the fourth embodiment of the present disclosure, similar to the previous third embodiment, a bypass valve 220 and a parallel flow path 610 may be connected in parallel. That is, the bypass valve 220 may be installed in a flow path diverging from the parallel flow path 610.

Further, the hydraulic system 104 may further include an additional valve block 901 detachably coupled to a main control valve housing 501 that accommodates a plurality of control spools 510 and in which the parallel flow path 610 is formed. That is, the additional valve block 901 may be coupled to the main control valve housing 501, if necessary, and may be separated, if not necessary.

Further, the additional valve block 901 may have an additional parallel flow path connected with the parallel flow path 610, one or more additional control spools 520 each connected in parallel to the additional parallel flow path 620, and a plurality of additional electronic proportional pressure reducing valves 720 adjusting a pilot pressure that is applied to an end of each of the one or more additional control spools 520 in proportion to an input current signal. In this configuration, the additional control spool 510 may be provided in proportion to the number of option devices to be controlled through the additional valve block 901.

Further, the additional valve block 901 may further have an additional connection flow path 650 connecting the additional control spool 520 to the additional parallel flow path 620 and an additional check valve installed in the additional connection flow path 650 and restricting movement of a hydraulic fluid from the additional connection flow path 650 to the additional parallel flow path 620.

Further, the additional valve block 901 may further have first additional supply flow paths 691 connected with first side regions of the additional control spools 520, respectively, and second additional supply flow paths 692 connected with second side regions of the additional control spools 520, respectively. Accordingly, a hydraulic fluid can be supplied through the first additional supply flow path 691 or the second additional supply flow path 692, depending on switching, that is, a change of position of the additional control spools 520.

The additional valve block 901 provided in this way can be used to drive an option device (not shown). That is, according to the fourth embodiment of the present disclosure, it is possible to expand and use the hydraulic system 104 such that the hydraulic system 104 can control more driving apparatuses.

Hereafter, an electronic hydraulic control valve 1010 used in the hydraulic systems 101, 102, 103, and 104 according to the first to fourth embodiment of the present disclosure is exemplarily described with reference to FIGS. 5 to 8. The electronic hydraulic control valve 1010 is a type in which the electronic proportional pressure reducing valve block 701 is coupled to the main control valve housing 501. Further, in the description of the electronic hydraulic control valve 1010, the same terms are used for the same components of the hydraulic systems 101, 102, 103, and 104 described above, but are given different reference numerals.

Figure 5:
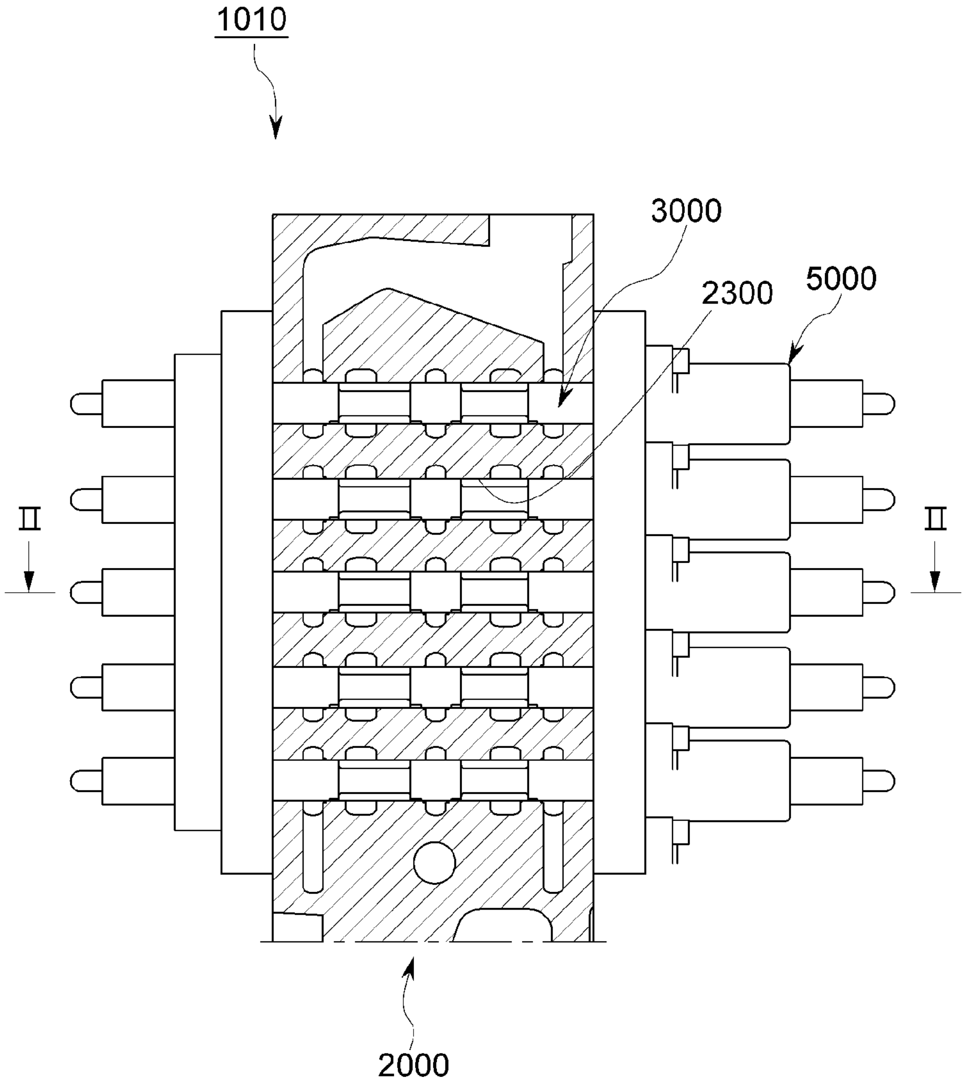
FIG. 5 is a cross-sectional view of an electronic hydraulic control valve used in the hydraulic systems according to the first to fourth embodiments of the present disclosure.
Figure 6:
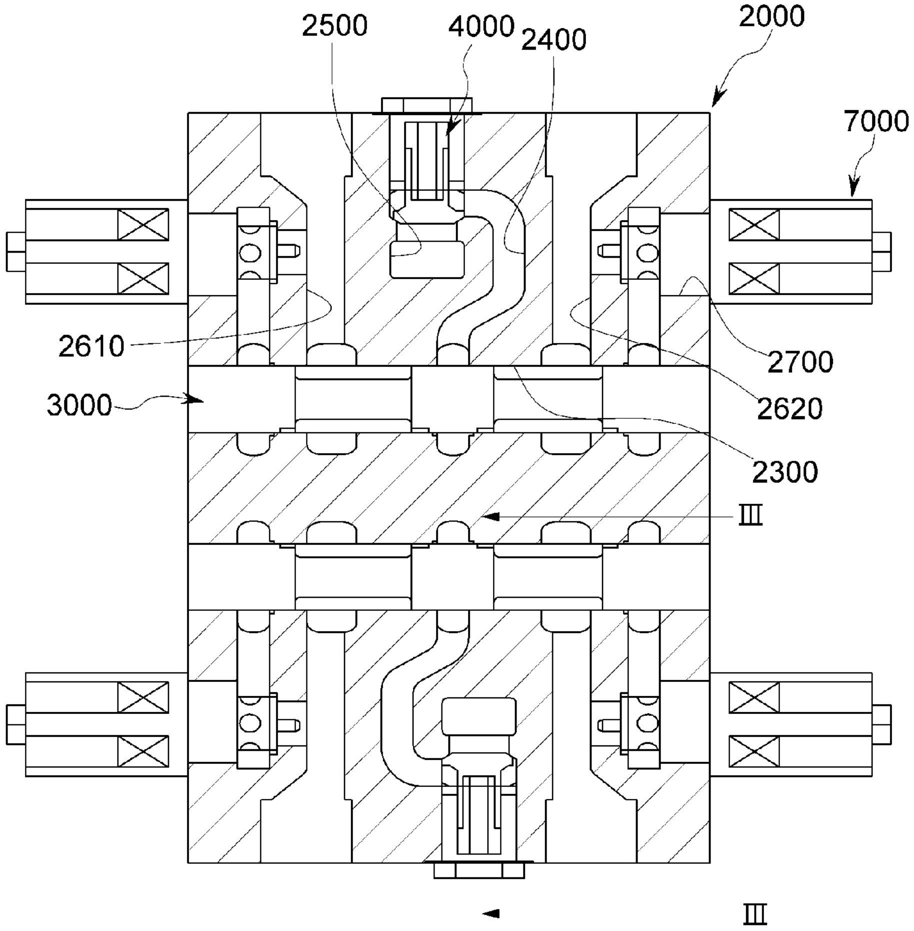
FIG. 6 is a cross-sectional view of the electronic hydraulic control valve taken along line II-II of FIG. 5.
Figure 7:
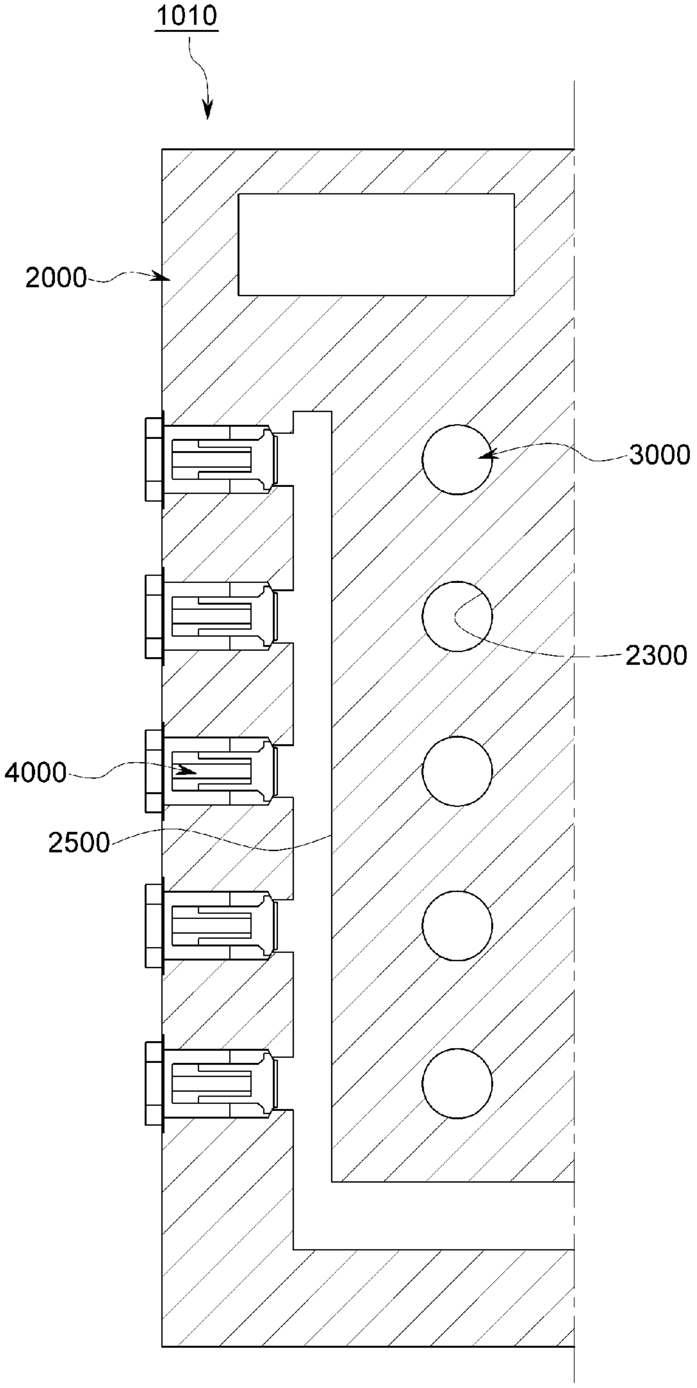
FIG. 7 is a cross-sectional view of the electronic hydraulic control valve taken along line III-III of FIG. 6.

As shown in FIGS. 5 to 7, the electronic hydraulic control valve 1010 includes a valve body 2000, a plurality of control spools 3000, and a plurality of check valves 4000.

Further, the electronic hydraulic control valve 1010 may further include a plurality of electronic proportional pressure reducing valves (EPPRV) 5000 and an overload relief valve 7000.

The valve body 2000 may include a plurality of spool accommodation portions 2300, a plurality of first supply flow paths 2610, a plurality of second supply flow paths 2620, one parallel flow path 2500, and a plurality of connection flow paths 2400.

Further, the valve body 2000 may further include a plurality of relief valve coupling portions 2700.

The spool accommodation portions 2300 may be formed in parallel with each other. For example, a plurality of spool accommodation portions 2300 may be arranged in parallel in two rows in the lengthwise direction of the valve body 2000 while having a length in the transverse direction of the valve body 2000. Further, a plurality of control spools 3000 to be described below may be movably accommodated in the plurality of spool accommodation portions 2300, respectively.

The plurality of first supply flow paths 2610 may be connected with first side regions of the plurality of spool accommodation portions 2300, respectively.

The plurality of second supply flow paths 2620 may be connected with second side regions of the plurality of spool accommodation portions 2300, respectively.

The parallel flow path 2500 may be spaced apart from the plurality of spool accommodation portions 2300 and formed in a direction crossing the plurality of spool accommodation portions 2300. For example, when the plurality of spool accommodation portions 2300 is formed to have a length in the transverse direction of the valve body 2000, the parallel flow path 2500 may be formed to have a length in the lengthwise direction of the valve body 2000. The parallel flow path 2500 can be supplied with a hydraulic fluid from the outside and the hydraulic fluid flowing in the parallel flow path 2500 moves toward the spool accommodation portions 2300. For example, a hydraulic fluid discharged by a hydraulic pump may flow into the parallel flow path 2500.

The plurality of connection flow paths 2400 may connect the parallel flow path 2500 and the center regions of the plurality of spool accommodation portions 2300, respectively.

The plurality of relief valve coupling portions 2700 may be connected to the plurality of first supply flow paths 2610 and the plurality of second supply flow paths 2620, respectively.

The plurality of relief valve coupling portions 2700 may be formed to be connected to one or more of both ends of the plurality of spool accommodation portions 2300, respectively. The overload relief valve 7000 to be described below may be installed at each of the plurality of relief valve coupling portions 2700.

Further, the first supply flow paths 2610, the second supply flow paths 2620, the connection flow path 2400, the connection flow paths 2400, the plurality of relief valve coupling portions 2700, and the check valves 4000 to be described below are arranged in two rows in the lengthwise direction of the valve body 2000 and may be formed such that the first supply flow paths 2610, the second supply flow paths 2620, the connection flow path 2400, the connection flow paths 2400, the plurality of relief valve coupling portions 2700, and the check valves 4000 in different rows are symmetric to each other.

The plurality of control spools 3000 may be movably installed in the plurality of spool accommodation portions 2300, respectively. Further, as the positions of the plurality of control spools 3000 are changed, the movement direction of a hydraulic fluid can be controlled.

Further, as the positions of the control spools 3000 are changed, the hydraulic fluid flowing in the spool accommodation portions 2300 through the connection flow paths 24000 moves to one selected from the first supply flow path 2610 or the second supply flow path 2620.

For example, a swing motor can swing left when a hydraulic fluid is supplied through the first supply flow path 2610 of the electronic hydraulic control valve 1010 and can swing right when a hydraulic fluid is supplied through the second supply flow path 2620. Further, a cylinder can stretch when a hydraulic fluid is supplied through the first supply flow path 2610 of the electronic hydraulic control valve 1010 and can contract when a hydraulic fluid is supplied through the second supply flow path 2620.

The plurality of check valves 4000 may be installed at the intersections of the parallel flow path 2500 and the plurality of connection flow paths 2400, respectively. Further, the plurality of check valves 4000 can restrict movement of a hydraulic fluid from the plurality of connection flow paths 2400 to the parallel flow path 2500.

The overload relief valve 7000 is installed at each of the plurality of relief valve coupling portions 2700 and can reduce a peak pressure that is generated in the plurality of first supply flow path 2610 and the plurality of second supply flow paths 2620.

When the pressure of a hydraulic fluid instantaneously rapidly increases while various driving apparatuses are operated, the check valves 4000 can protect a hydraulic pump by preventing a hydraulic fluid from flowing backward to the hydraulic pump. Further, when the check valves 4000 completely block flow of a hydraulic fluid, it is possible to prevent driving apparatuses such as a boom cylinder from sagging due to their weight.

Further, the plurality of check valves 4000 may be disposed to be biased and relatively adjacent to any one of the plurality of first supply flow paths 2610 and the plurality of second supply flow paths 2620 between the plurality of first supply flow paths 2610 and the plurality of second supply flow paths 2620, respectively.

The plurality of connection flow paths 2400 may be formed to be biased and relatively adjacent to the other one of the plurality of first supply flow paths 2610 and the plurality of second supply flow paths 2620 between the plurality of first supply flow paths 2610 and the plurality of second supply flow paths 2620, respectively.

As described above, since the plurality of check valves 4000 are disposed to be biased, it is possible to secure a space for forming the plurality of connection flow paths 2400 and reduce the entire size of the valve body 2000.

Figure 8:
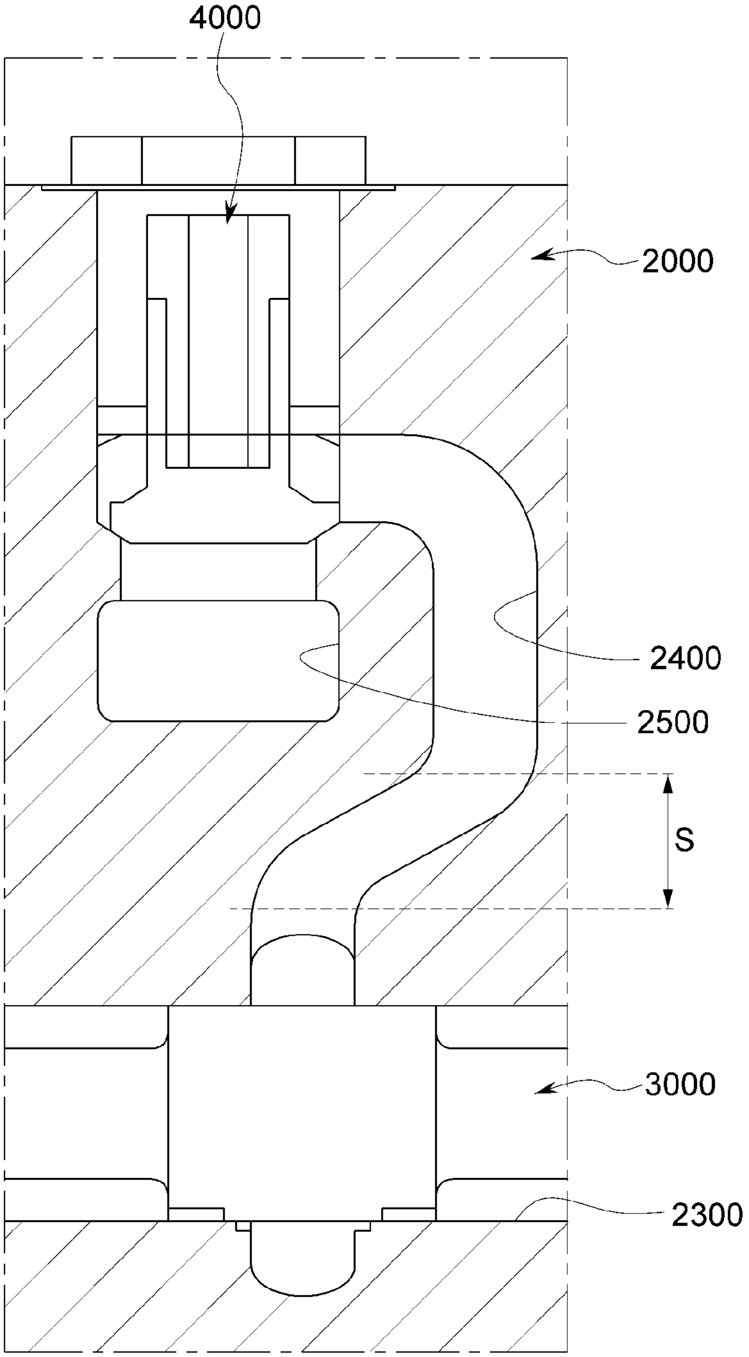
FIG. 8 is an enlarged cross-sectional view showing a check valve and a connection flow path in FIG. 6.

Further, as shown in FIG. 8, the plurality of connection flow paths 2400 each may include an inclined section s. In detail, the connection flow paths 2400 are connected with the parallel flow path 2500 with the check valves 4000 therebetween and are disposed to be biased to a side different from the check valves 4000, thereby having an inclined section s. Accordingly, it is possible to reduce a loss of pressure. That is, the more the check valves 4000 are biased as far as possible away from the center, the longer the inclined sections of the connection flow paths 2400 can be secured, whereby it is possible to further reduce a loss of pressure.

The plurality of electronic proportional pressure reducing valves 7000 can control a pilot pressure that is applied to ends of the plurality of control spools 3000 in proportion to an input current signal. The plurality of control spools 3000 can control flow of a hydraulic fluid by changing the position depending on a pilot pressure.

As described above, the electronic hydraulic control valve 1010 is controlled in an electronic control type in which the control spools 3000 are controlled in accordance with a current signal that is input to the electronic proportional pressure reducing valves 7000.

Accordingly, it is possible to simplify the entire structure of the electronic hydraulic control valve 1010 and reduce the size thereof.

In particular, it is possible to have a valve body 200 suitable for the electronic hydraulic control valve 1010 that is controlled in an electronic control type that uses a current signal.

Figure 9:
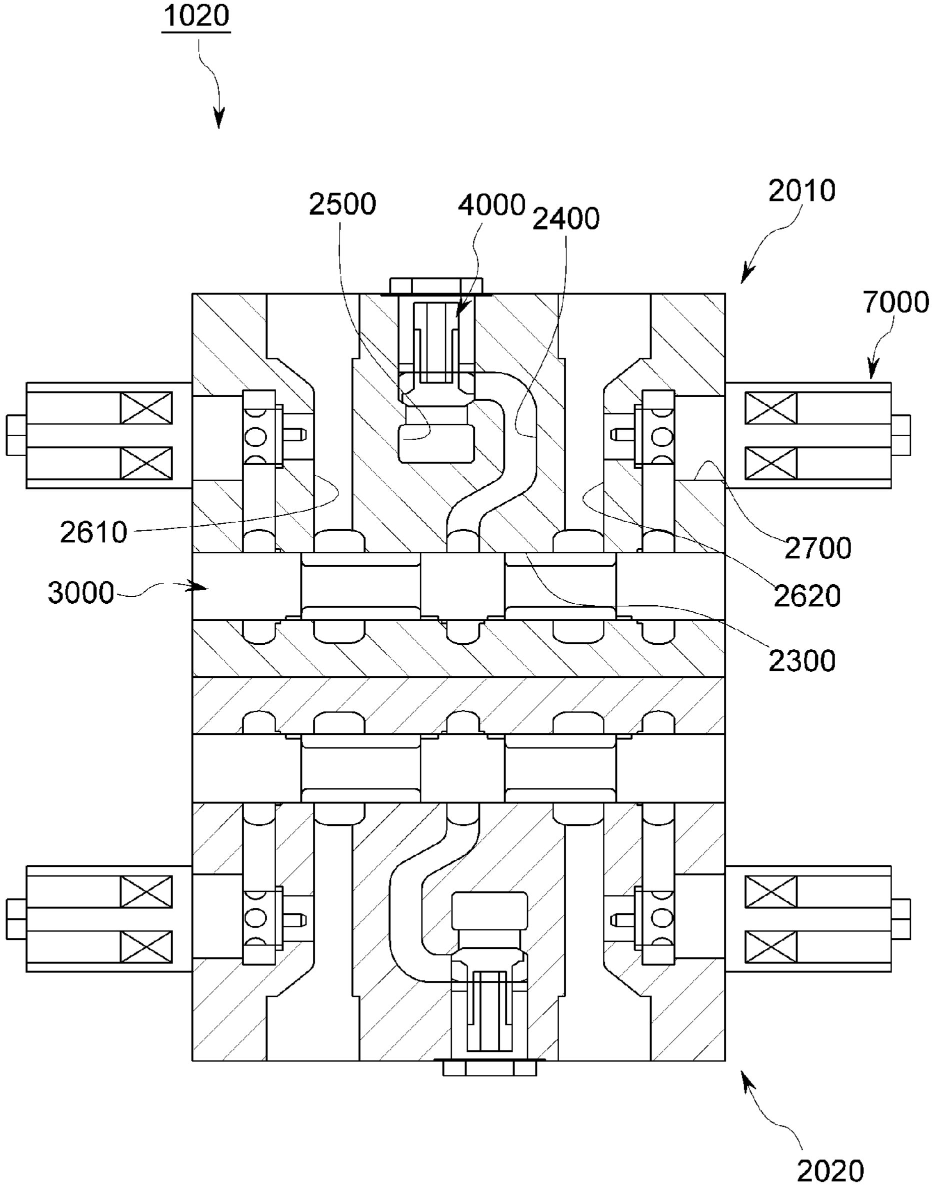
FIG. 9 is a cross-sectional view of an electronic hydraulic control valve modified from FIG. 2.

Meanwhile, as shown in FIG. 9, in a modified electronic hydraulic control valve 1020, a plurality of spool accommodation portions 2300 may be arranged in parallel in one row in the lengthwise direction of the valve bodies 2010 and 2020 while having a length in the transverse direction of the valve bodies 2010 and 2020. Further, a pair of valve bodies 2010 and 2020 may be coupled such that the first supply flow paths 2610, the second supply flow paths 2620, the connection flow paths 2400, and the check valves 4000 are symmetric to each other, respectively.

Accordingly, in the modified electronic hydraulic control valve 1020, it is possible to easily form several flow paths in the valve bodies 2010 and 2020.

Although exemplary embodiments of the present disclosure were described above with reference to the accompanying drawings, those skilled in the art would understand that the present disclosure may be implemented in various ways without changing the necessary features or the spirit of the prevent disclosure.

Therefore, it should be understood that the embodiments described above are not limitative, but only examples in all respects, the scope of the present disclosure is expressed by claims described below, not the detailed description, and it should be construed that all of changes and modifications achieved from the meanings and scope of claims and equivalent concept are included in the scope of the present disclosure.

DESCRIPTION OF REFERENCE NUMERALS

101, 102, 103, 104: hydraulic system
210, 220: bypass valve
211, 221: first bypass valve
212, 222: second bypass valve
300: main hydraulic pump
310: first main hydraulic pump
320: second main hydraulic pump
410: check valve
420: additional check valve
501, 502: main control valve housing
510: control spool
520: additional control spool
610: parallel flow path
620: additional parallel flow path
611: first parallel flow path
612: second parallel flow path
640: connection flow path
650: additional connection flow path
681: first supply flow path
682: second supply flow path
691: first additional supply flow path
692: second additional supply flow path
701: electronic proportional pressure reducing valve block
710: electronic proportional pressure reducing valve
720: additional electronic proportional pressure reducing valve
800: driving apparatus
901: additional valve block

INDUSTRIAL APPLICABILITY

Embodiments of the present disclosure can be used to provide an electronic control-type hydraulic system having a simplified entire structure.

What is claimed is:

1. A hydraulic system comprising:
a main hydraulic pump discharging a hydraulic fluid;
a plurality of driving apparatuses operating by receiving a hydraulic fluid;
a parallel flow path through which the hydraulic fluid discharged by the main hydraulic pump moves;
a plurality of control spools connected in parallel to the parallel flow path, respectively, and controlling supply of a hydraulic fluid to the plurality of driving apparatuses; and
a plurality of electronic proportional pressure reducing valves adjusting a pilot pressure that is applied to an end of each of the plurality of control spools in proportion to an input current signal,
wherein when the plurality of control spools is not operated, the hydraulic fluid discharged by the main hydraulic pump is drained into an oil tank through the parallel flow path without passing through the plurality of control spools,
the plurality of electronic proportional pressure reducing valves are installed in a separate electronic proportional pressure reducing valve block, and
the electronic proportional pressure reducing valve block is detachably coupled to a main control valve housing accommodating the plurality of control spools.

2. The hydraulic system of claim 1, further comprising a bypass valve installed in the parallel flow path and opening and closing the parallel flow path.

3. The hydraulic system of claim 2, wherein a hydraulic fluid that has passed through the bypass valve is drained into the oil tank.

4. The hydraulic system of claim 1, further comprising:
a plurality of connection flow paths connecting the plurality of control spools to the parallel flow path, respectively; and
a plurality of check valves installed in the plurality of connection flow paths, respectively, and restricting movement of a hydraulic fluid from the plurality of connection flow paths to the parallel flow path.

5. The hydraulic system of claim 1, further comprising:
a plurality of first supply flow paths connecting first side regions of the plurality of control spools to first sides of the plurality of driving apparatuses, respectively; and
a plurality of second supply flow paths connecting second side regions of the plurality of control spools to second sides of the plurality of driving apparatuses, respectively,
wherein a hydraulic fluid is supplied through the plurality of first supply flow paths or the plurality of second supply flow paths, depending on switching of the plurality of control spools.

6. The hydraulic system of claim 1, wherein the plurality of electronic proportional pressure reducing valves are installed in a main control valve housing accommodating the plurality of control spools.

7. The hydraulic system of claim 1, wherein the main hydraulic pump includes a first main hydraulic pump and a second main hydraulic pump, and the parallel flow path includes a first parallel flow path delivering a hydraulic fluid discharged by the first main hydraulic pump and a second parallel flow path delivering a hydraulic fluid discharged by the second main hydraulic pump.

8. The hydraulic system of claim 7, wherein the plurality of control spools are connected in parallel to the first parallel flow path or the second parallel flow path, respectively, and distributes the hydraulic fluids discharged by the first main hydraulic pump and the second main hydraulic pump to the plurality of driving apparatuses.

9. The hydraulic system of claim 1, further comprising a bypass valve connected in parallel to the parallel flow path.

10. The hydraulic system of claim 9, wherein a hydraulic fluid that has passed through the bypass valve is drained into the oil tank.

11. A hydraulic system comprising:

a main hydraulic pump discharging a hydraulic fluid;

a plurality of driving apparatuses operating by receiving a hydraulic fluid;

a parallel flow path through which the hydraulic fluid discharged by the main hydraulic pump moves;

a plurality of control spools connected in parallel to the parallel flow path, respectively, and controlling supply of a hydraulic fluid to the plurality of driving apparatuses;

a plurality of electronic proportional pressure reducing valves adjusting a pilot pressure that is applied to an end of each of the plurality of control spools in proportion to an input current signal;

a bypass valve connected in parallel to the parallel flow path; and an additional valve block accommodating the plurality of control spools and detachably coupled to a main control valve housing in which the parallel flow path is formed, wherein when the plurality of control spools are not operated, the hydraulic fluid discharged by the main hydraulic pump is drained into an oil tank through the parallel flow path without passing through the plurality of control spools, and wherein the additional valve block has:

an additional parallel flow path connected with the parallel flow path;

one or more additional control spools each connected in parallel to the additional parallel flow path; and a plurality of additional electronic proportional pressure reducing valves adjusting a pilot pressure that is applied to an end of each of the one or more additional control spools in proportion to an input current signal.

12. The hydraulic system of claim 11, wherein the additional valve block further has:

an additional connection flow path connecting the additional control spool to the additional parallel flow path; and an additional check valve installed in the additional connection flow path and restricting movement of a hydraulic fluid from the additional connection flow path to the additional parallel flow path.

13. The hydraulic system of claim 11, wherein the additional valve block further has:

first additional supply flow paths connected with first side regions of the additional control spools, respectively; and second additional supply flow paths connected with second side regions of the additional control spools, respectively, and a hydraulic fluid is supplied through the first additional supply flow path or the second additional supply flow path, depending on switching of the additional control spools.

14. The hydraulic system of claim 11, wherein a hydraulic fluid that has passed through the bypass valve is drained into the oil tank.

* * * * *